United States Patent [19]
Foster

[11] 3,898,059
[45] Aug. 5, 1975

[54] METHOD AND APPARATUS FOR TREATING POLLUTED AIR ALONG AUTO TRAFFIC ARTERIES

[76] Inventor: Chester L. Foster, 404 Nelray, Austin, Tex. 51787

[22] Filed: May 9, 1973

[21] Appl. No.: 358,688

[52] U.S. Cl. ............................ 55/94; 55/98; 55/223
[51] Int. Cl. ............................................. B01d 53/14
[58] Field of Search ............... 55/84, 85, 90, 93, 94, 55/97, 98, 226, 227, 223, 259

[56] References Cited
UNITED STATES PATENTS
3,731,459  5/1973  Foster ................................. 55/94

*Primary Examiner*—Charles N. Hart
*Attorney, Agent, or Firm*—Marion E. Shafer

[57] ABSTRACT

Method and apparatus for collecting polluted air along crowded automobile thoroughfares channelling said polluted air through unused but controlled portions of existing storm sewers used as air passageways, together with apparatus for scrubbing, washing and filtering said collected air in area air treatment plants and recirculating the purified air back to sidewalk areas along the streets affected by heavy auto traffic and air pollution.

5 Claims, 9 Drawing Figures

METHOD AND APPARATUS FOR TREATING POLLUTED AIR ALONG AUTO TRAFFIC ARTERIES

SUBJECT MATTER OF THE INVENTION

This invention relates generally to air cleaning and purification systems and relates more particularly to street and area air purification systems in which the unused portions of storm sewer lines are used as a means of gathering and channelling polluted air into an area air treatment plant for purification and recirculation.

BACKGROUND OF THE INVENTION

There is an abundance of patent and commercial art relating to collecting stale or polluted air and circulating treated, purified and even refrigerated fresh air to the habitable interior areas of homes, buildings, trains, aircraft, automobiles and even to ventilation of subway tunnels. Some consideration has been given to means for venting poisonous gases that form in mine shafts and even to venting gases from metropolitan sewer systems but in all of these instances the great outdoor reservoir of air is both regarded as a source of fresh air and as a sewer dump into which polluted air may be dumped for removal by natural dispersion processes — we hope. However, any pedestrian standing on the sidewalk of a busy metropolitan automobile thoroughfare or standing near a bus stop can verify that natural dispersement processes do not remove smog and pollution from our metropolitan streets and sidewalks rapidly enough to prevent many people from becoming nauseated and seriously ill. A few dreamers have speculated about apparatus to gather smog and polluted air from drive-in parking areas and streetside areas by means of special underground channels and expensive air treating apparatus.

Limited quantities of air for circulation or recirculation within closed buldings or vehicles may be practical where customer or occupant comfort justifies the expense but a huge quantity of air requiring treatment and recirculation from open street thoroughfares completely swamps and handling ability of conventional air treatment processes. In order to cope with the overwhelming quantities of smog and street air pollution along metropolitan auto traffic thoroughfares a means is needed for inexpensively gathering polluted air from said traffic thoroughfares and routing said quantities of air to area air treatment and recirculation plants where a selected combination of air treatment and purification procedures that employ inexpensive preliminary air scrubbing and air washing techniques to remove solid particles and major volume pollutants before the air is channelled through comparatively expensive saturable and replaceable air filter systems such as activated charcoal.

OBJECTS OF THE INVENTION

It is therefore an object of this invention to present a method and apparatus by which smog and polluted air from metropolitan automobile thoroughfares may be pulled out of the streets and away from pedestrian sidewalks into storm sewer input openings and by exploiting the unused air space in conventional and already installed municipal storm sewers create low cost air passageways along and through said storm sewer lines to regional or area air treatment and recirculation points together with a recommended combination air treatment process for cleaning and purifying large quantities of air at minimum expense.

Another object of the invention is to use low cost air scrubbing and air washing techniques of air purification as an inexpensive preliminary means of desaturating said polluted air of the more solid and heavier particles before passing said air through more expensive filtering means that have only limited absorption capacity.

A further object of the invention is to trap as much of the air pollutant material as possible into a water solution that can be conveniently and inexpensively disposed of thorugh the city's conventional sewage system.

A still further object of the invention is to devise an automatically operated valve system which will block the flow of air and thereby permit the designer of such an air treatment system to limit and control the area from which polluted air is drawn to a defined area of sufficiently limited size as to be within the working capacity of the particular air treatment plant designed for the area while providing means for automatically opening such valves by the flow of water so that said water-release, air-seal valves permit water to freely flow through said storm sewers in conventional manner when rains occur.

These and other objects and advantages of this invention will become apparent through the consideration of the following specification and appended claims in conjunction with the attached drawings in which:

In describing one selected form of preferred embodiment of this invention as shown in the drawings and in this specification, specific terms and components are used for clarity. However, it is not intended to limited the claimed invention to the specific form, components, or construction shown and it is to be understood that the specific terms used in this illustration of the invention are intended to include all technical equivalents which operate in a similar manner to accomplish a similar purpose.

SUMMARY OF INVENTION

In summary, the method or process and apparatus for practicing said method of treating polluted air along auto traffic arteries contemplates employing unused portions of existing storm sewer lines paralleling heavily used auto thoroughfares as air passageways 31 by which polluted air is gathered from said auto thoroughfares by appropriate air input means 36, conducted through selected portions of said storm sewer air passageways 31 to area air treatment and recirculation plants 11—11 where said polluted air is washed, treated, filtered and then redistributed along said streets. In the first instance selected portions of said storm sewer line system paralleling portions of the thoroughfare to be treated are isolated by means of self operating water-relief, air seal-valves 32—32 to limit the air input into an area system to a practical quantity that can be pulled and moved through a controlled portion of the storm sewer passageways by an area suction-blower fan means 26, with such collected column of moving air being channelled through an air inlet duct 37 into area air treating and recirculating plant 11. Within said area air treatment plant 11 the moving column of polluted air is subjected to an "air scrubbing" process 14 by having a spray of fine water, which may be mixed with other appropriate chemicals or treatment cleaning compounds, from a plurality of air scrubber spray nozzles 15—15 sprayed through said moving column of water. After the moving column of air has been treated by air scrubber filter system 14, said column of air is fed into and through an air wash treatment process 17 where the air must flow through a falling curtain of water and pass through a filter formed in thin slot like passageways between parallel spaced apart concave air washer basins 18—18 filled with water where the pollution laden moisture striking the cool bottoms of washer basins 18—18 tends to condense and merge into the water in next lower washer basins 18—18. The washed air output from air washer filter system 17 is then channelled through a porous activated charcoal filtering process 24 where much of the remaining residue of gaseous pollutants are removed by said charcoal filter 24. This column of air is kept in motion through said storm sewer air passageways 31 and area air treatment plant 11 by means of a power driven suction-blower fan device 26 and said treated and cleaned fresh air is directed back out on to the sidewalks and streets of the area by means of conventional distribution and outlet ducts 28 as the physical circumstances of the area may require.

DETAILED DESCRIPTION OF PREFERRED EMBODIMENT OF INVENTION

Referring to the specific embodiment of the invention selected for illustration in the accompanying drawings, the number 11 is used to designate generally an area air treatment and recirculation plant with a plurality of similar spaced apart air treating and recirculation plants 11—11 located at spaced apart intervals several blocks from each other along major metropolitan traffic thoroughfares. The apparatus involved in practicing the method of treating, cleaning and recirculating polluted air from auto traffic arteries contemplated by this invention may be divided into the apparatus within the area air treatment and recirculation plant 11 and the external air gathering apparatus which is designed to exploit and work with a community's existing storm sewer passageway system 31.

Most grandiose schemes for subways, new modes of public transportation, expressways and related public improvement projects founder on their outrageously expensive need to rip open and reshape the face of existing cities while trespassing upon the irritating thousands of displaced or adversely affected citizens in the immediate vicinity of the proposed public works project. However, many large cities in the process of routing and building their major expressways and auto traffic thoroughfares have already built those thoroughfares along or over the creek beds or natural drainage systems so that the waters of many streams and creeks are now enclosed in huge storm sewer pipes or alternatively are enclosed in large concrete channels running underneath or parallel to street and automobile thoroughfares. These subterranean storm sewer passageways 31—31 have to be huge to be able to carry off the vast surge of water following a rain storm or cloud burst while most of the time such special storm sewer passageways carry only a trickle of water and often no water at all since regular municipal sewage is usually channelled through a separate system. Thus most metropolitan areas with heavy auto traffic thoroughfare problems will also have already installed ready made subterranean air gathering and air conductance systems 31—31 under the major streets and thoroughfares which with only modest alterations and modifications can be adapted to perform double duty both as a conventional storm sewer system and as an air passageway system when said storm sewers are not completely filled with water. Since there will be little need for air purification during periods of heavy rainfall when storm water will be flowing through said storm sewer systems 31—31 and there will be little or no water in said storm sewer passageways during the dry periods between rain storms that there will be very little conflict involved in adapting such subterranean passageways 31—31 to perform double duty as both air gathering and conducting passageways and as storm sewer passageways.

A means is needed by which polluted air from the city streets may be gathered and channelled into said storm sewer passageways 31—31 and this need is already provided for in existing curb side storm sewer openings 36—36 at present street corners since these already provide a suitable air input system into storm sewer passageways 31—31. Such air intake means 36 from the street into storm sewer passageways 31—31 may be supplemented by additional appropriate air intake ducts and apparatus installed along sidewalks and along the face of buildings paralleling the expressway with appropriate conductance connections into storm sewer passageways 31—31. At appropriately selected locations near the center of the areas to be served there will be constructed area air treatment and recirculation plants 11—11 with an air inlet duct 37 connecting said air passageways 31—31 with the input into air treatment and recirculation plant 11. The prime moving force for setting into motion polluted air to be pulled into and through storm sewer passageway system 31—31 will be a suction-blower fan device 26 provided in area air treatment and recirculation plant 11. Since this blower-fan 26 cannot produce sufficient vacuum or draft to pull air from all over an entire city the air conduction potentialities of storm sewer passageway systems 31-31 must be provided with a means for limiting the air gathering potential of the system to a selected, limited and controlled specific area within the air handling capacity of the suction-blower fan means 26 provided.

Figure 1:
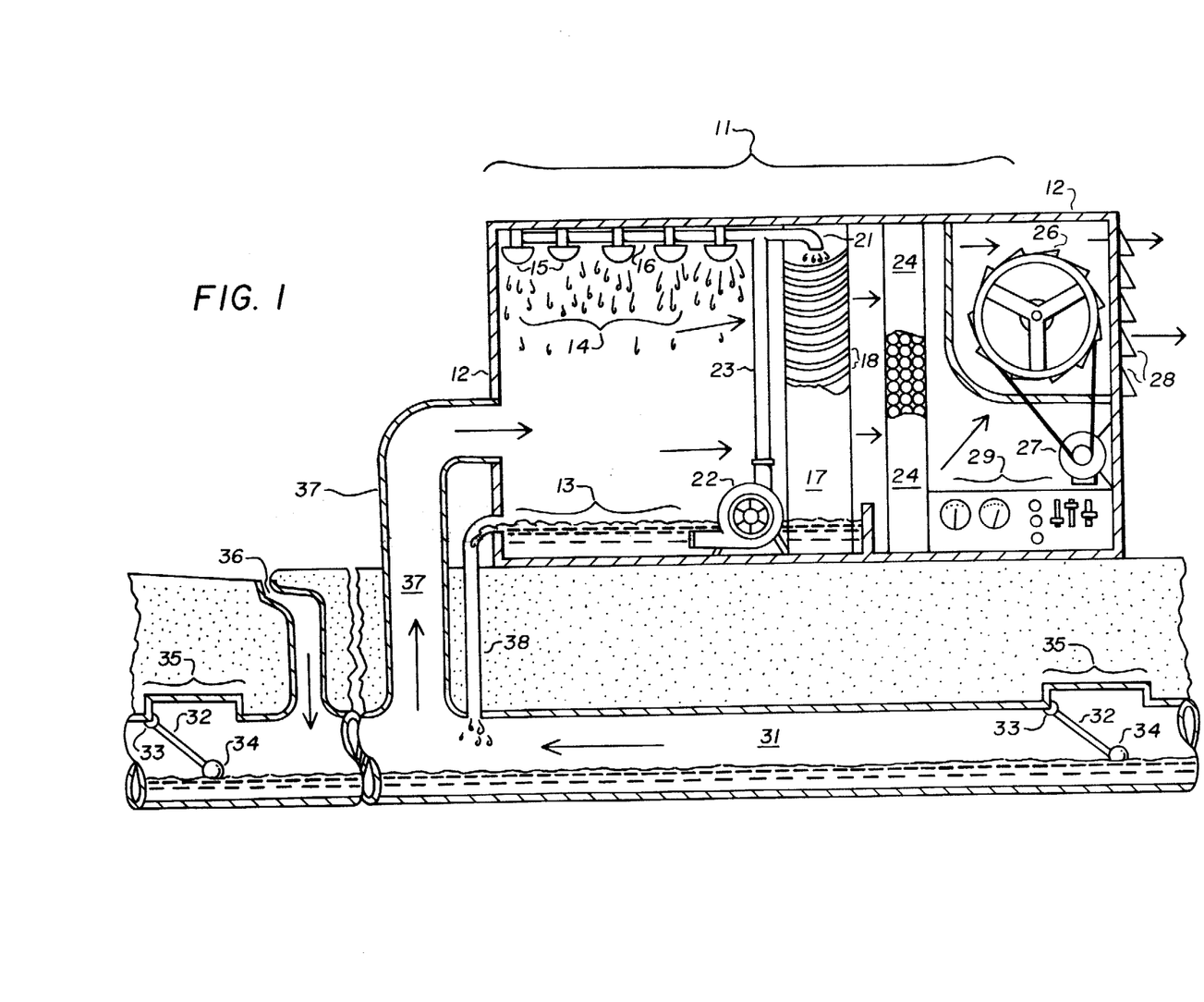
FIG. 1 is a schematic plan drawing providing a broad general presentation of the over-all system of apparatus and operation.
Figure 2:
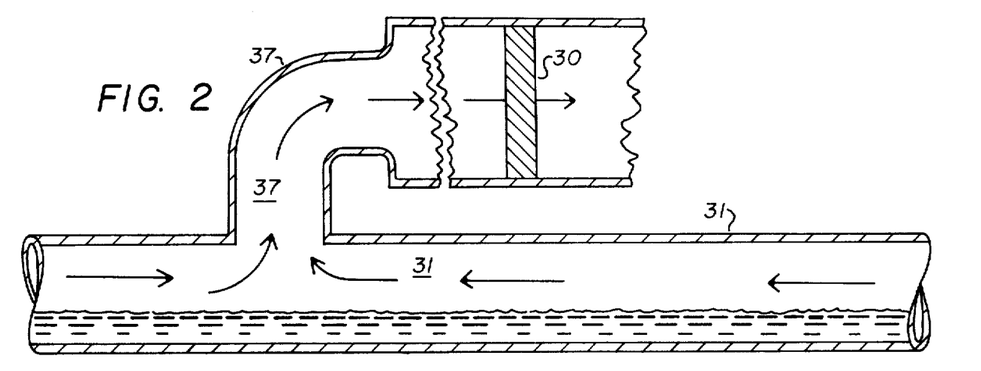
FIG. 2 is a plan view of the input duct conveying polluted air from the storm sewer into the input portion of the air treatment plant showing an additional and optional mechanical input filter which can be inserted at the beginning of the air treatment process.
Figure 5:
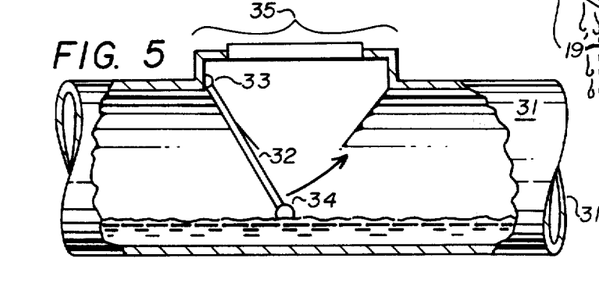
FIG. 5 is a part perspective, part plan view drawing illustrating the details of the automatic air-seal, water-relief valve contemplated by this invention as a means of limiting and controlling the flow of air through selected portions of municipal storm sewer systems.
Figure 6:
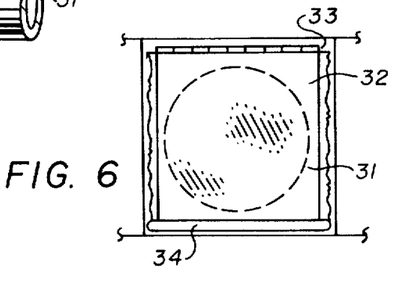
FIG. 6 is a front plan view of said air-seal, water-relief automatic valve illustrated in FIG. 5.

Water-relief, air-seal valve 32 will usually be inserted in series with storm sewer line 31 but will ordinarily be constructed in a special valve housing or enclosure 35 which, as shown in FIG. 5 of the drawings, provides for a mounting space in the upper part of said valve housing chamber 35 into which valve flap panel 32 may be rotated to remove valve flap panel 32 completely from the path of water flow when large quantities of water are flowing past. Valve housing 35 as shown in FIG. 5 of the drawings may be provided with a man hole cover extending to the surface of the earth to permit entry and repair of the valve apparatus but in other instances said valve and valve housing may very well be totally constructed underground as illustrated in FIG. 1 of the drawings. As illustrated in FIG. 5 and FIG. 6 of the drawings water-relief, air-seal valve 32 takes the form of a rectangular flap panel designed to hang across and cover the entrance from a round storm sewer pipe 31 or a vaulted storm sewer tunnel so that the exact shape of the sides of valve flap panel 32 may have to be contoured to conform with the shape and space available in the storm sewer line or in the valve housing structure available. The upper edge of valve flap panel 32 pivots inward from horizontal hinge 33 which attaches to the walled surface of valve housing 35 just above the entrance from storm sewer line 31. Across the lower end of valve flap panel 32 there is provided a horizontally positioned water operated valve lift float structure 34 adapted to float or ride on the surface of whatever water is flowing through storm sewer line 31 and adapted to support the lower end of valve flap panel 32. Since said valve flap panel 32 rises (opens) and lowers (closes) with the rise and fall of the water level flowing through storm sewer line 31 said water-release, air-seal valve 32 does not interfere with the normal flow of storm sewer water. However, since said valve flap panel 32 is constructed of an air resistant material it serves as an air tight door or partition that isolates, defines or limits the portion of storm sewer line 31 from which air may be drawn for treatment in air treatment and recirculating plant 11. It will be readily appreciated by studying the drawings provided in FIG. 5 and FIG. 6 that float structure 34 mounted on the lower end of valve flap panel 32 is automatically actuated by the level of water flowing through storm sewer line 31 in such manner as to automatically permit storm water to pass freely through said water-release valve 32 while at the same time also being automatically positioned as necessary to seal off and prevent the passage of air past air-seal valve 32 so that said valve works in both capacities — without interfering with the normal flow of rain water through storm sewer line 31.

FIG. 1 of the drawings herein illustrates a regional or area air treatment and recirculation plant 11 in which the first air treatment step applied to the moving column of air coming in from input duct 37 is subjected to an air scrubbing process 14. Air scrubbing is a relatively inexpensive process and removes a broad spectrum of solid and semi-solid pollutants so that it is a logical first filtering step in a sequence of cascade filter systems but in some climate regions or areas there may be an additional first or preliminary filtering step required. It will not be practical to insert filter devices or screens across the input entrances to normal street level storm sewer openings 36 — 36 since it is normally customary to rely upon the storm sewers to carry away trash and bits of minor debris from the streets and curbs but in some climates such open inputs 36 — 36 into storm sewer channels 31— 31 will pick up a substantial number of bugs, moths and flying particles which may be carried by the updraft through input duct 37 into the input portion of air treatment plant 11. In such cases it may be necessary, even if moderately expensive, to insert a preliminary input mechanical screen or filter 30 at the entrance to air treatment plant 11 or at some suitable point in the channel of input duct 37. Since said screen or mechanical input filter 30 will inevitably become clogged with the residue of insects and flying debris said input mechanical filter 30 should be of an insertable - removable type that can be replaced periodically. Where construction circumstances permit it may well be desirable to construct mechanical input filter 30 in such manner as to lie transversely across the vertical rise portion of input duct 37 so that at least part of the insects and flying debris that strike the input filters of mechanical input filter 30 fall backward into such water as may be flowing through storm sewer passageway 31 for ultimate disposal with said storm sewer water.

Figure 7:
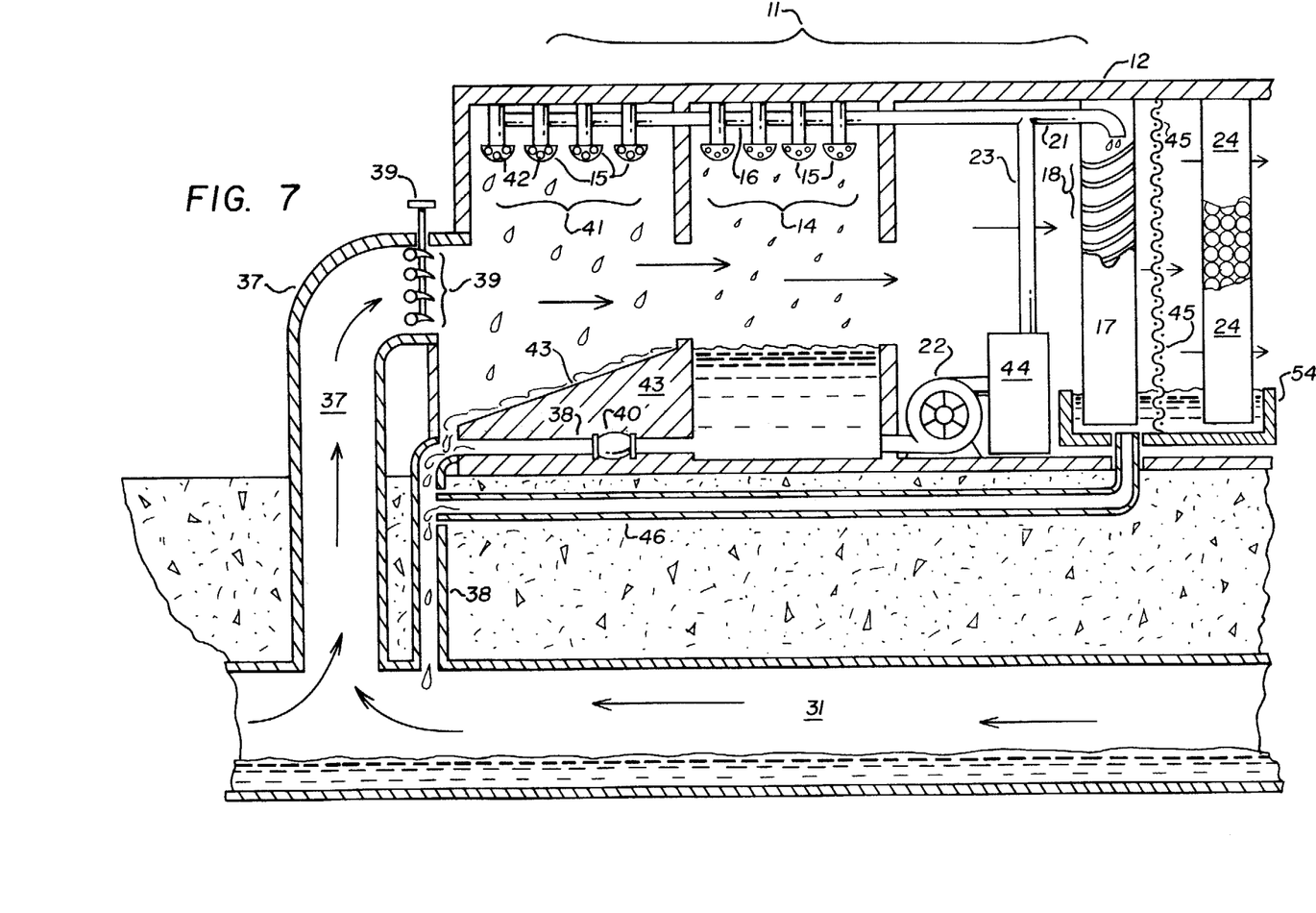
FIG. 7 is a schematic plan drawing of an alternate combination of air treatment apparatus in the air treatment plant.

An alternate method of constructing input duct 37 would be to provide an adjustable air flow regulator vent 39 as illustrated in FIG. 7 to aid in the preliminary screening of flying debris as well as to provide an easily accessible exterior means of controlling the amount of air cleansed in the treatment and recirculating plant to keep it running at an optimum productive level. Such an air flow regulator vent could consist of a plurality of slightly curved slats like those in a common Venetian blind that overlap each other and move in unison when controlled by an exterior push-pull rod. To increase the efficiency of the air scrubbing process 14, the inventor has proposed the additional stage of an "air beating" shower bath 41 to be placed between the entranced air inlet duct 37 into the treatment plant and the previously described air scrubbing step 14 as shown in FIG. 7. The air beating shower bath 41 uses air scrubber spray nozzle 15 with a large size of spray nozzle outlet holes 42—42 than those used in the air scrubber in order to eliminate the heaviest debris that may enter with the air to be treated. Since the debris to be treated by the air beating shower bath is expected to include insects, bits of paper, leaves, etc., that would readily fill and clog water reservoir 13 and horizontal portion of bleed-off overflow duct 38 — used to clean settled debris from the bottom of reservoir 13 by periodic operation of sludge emission regulator valve 40, debris sweep drain-off ramp 43 has been placed directly under shower bath 41 to be channelled down the incline immediately into the vertical section of overflow duct 38 and onto storm sewer air passageway 31 thereby avoiding the horizontal section of overflow duct 38. Since much of the debris will have been removed by the air beating shower 41, the air scrubber means 14 will serve as an intermediary stage in retaining the rather vigorous action of the large drops of the shower bath 41 from entering the remaining stages of the air treatment plant as well as removing the finer pollutant particles from the air primarily by absorption rather than by forcefully knocking them out of the air as in the shower bath.

Figure 8:
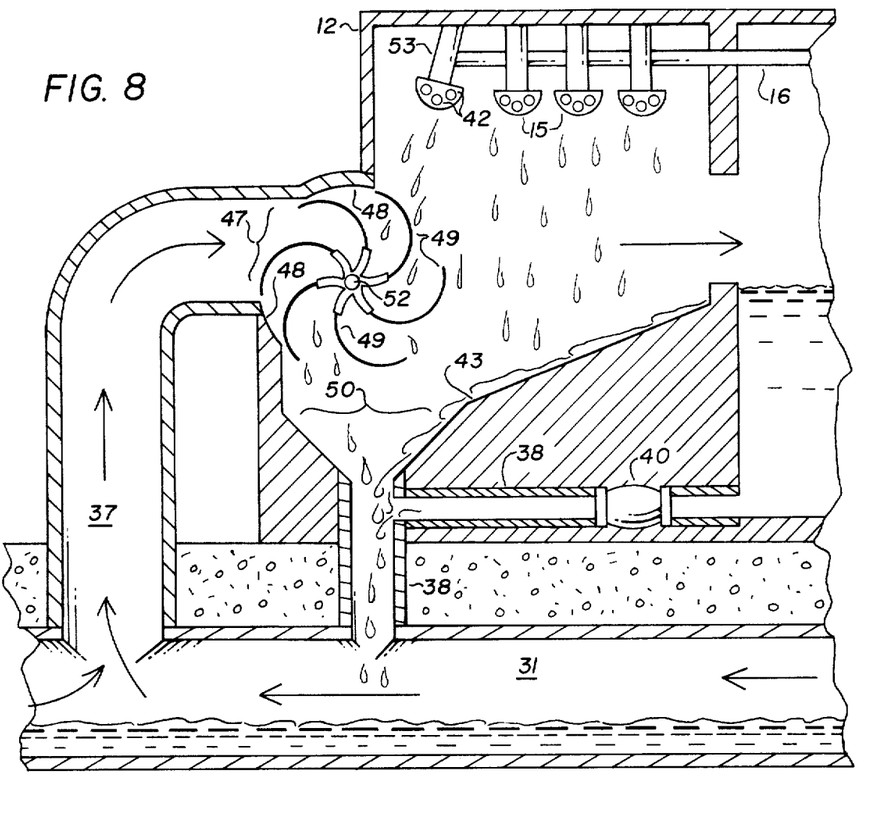
FIG. 8 is a schematic fractional plan drawing of another alternate combination of the air entry end and initial air scrubbing stage of the air treatment plant.
Figure 9:
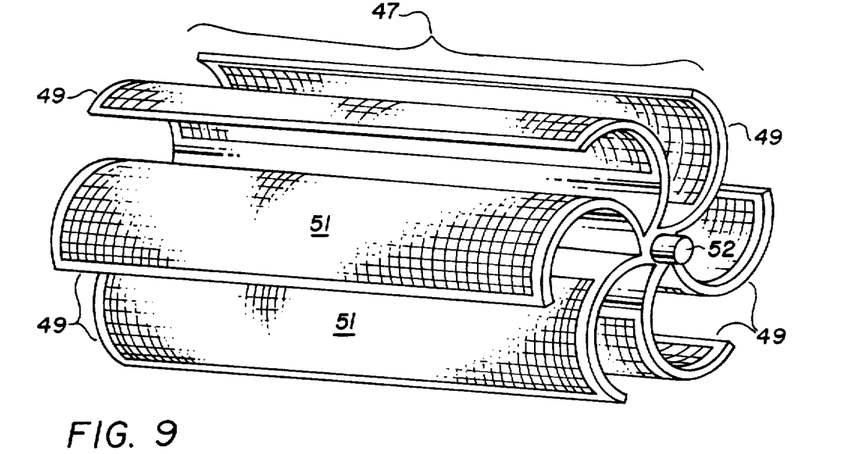
FIG. 9 is a detail perspective view of the rotary input debris sweep mechanism used in the alternate version of the air entry and scrubbing stage of the air treatment plant as shown in FIG. 8.

Another proposed method of initially eliminating the debris from the stream of air is shown in FIG. 8 utilizing a motor-driven rotary input debris sweep mechanism 47, rotating on an axle 52 at the entrance of the air inlet duct 37 into the air treatment plant 11 that rotates clockwise as seen in the drawings. The air inlet duct 37 and the end wall of the housing enclosure 12 are curved and modified to form concave rotary clearance surfaces 48—48 that conform closely to the radius of rotary input debris mechanism 47 having a very small motion clearance space forcing what flying debris entering with the air into concave debris trapping fins 49—49 to be carried around the cycle and dumped when the concave fin is upside down into debris catching bin 50 to be eliminated by vertical bleed-off overflow duct 38 as described above. To prevent an undue amount of air and water from getting caught in said debris trappping fins 49—49, wire screen filtering sections 51—51 are provided along the length of the trapping fins to allow air to flow through and water to drop out of the input debris sweep mechanism 47. To further aid in entrapping into concave debris fins 49—49 an air scrubber spray nozzle 53 has been aimed directly at the rotary input debris sweep mechanism 47 to direct flying debris into said trapping fins. The rotary input debris sweep mechanism 47 is propelled by a conventional motor drive of a selected speed which is readily available and known in the art and is therefore not illustrated in the drawings. Returning to a description of the apparatus involved in air treatment and recirculation plant 11 the Invention contemplates that most of such air treatment apparatus for a given region or area will be concentrated in a suitable housing enclosure 12 which in turn may be located at convenient points on city property under existing streets or sidewalks, built into out-of-the-way niches or locations along public sidewalks or in alleys, and in some instances may be located in leased space facilities on top of existing office buildings or commercial structures along said auto traffic right of ways or on other suitable municipal properties in the area. In the ordinary situation the floor area of the input portion of the interior of air treatment plant 11 will be occupied by water reservoir 13 which will be supplied and replenished by conventional sources of commercial or municipal water channelled in and regulated by conventional input pumping facilities and therefore not illustrated in FIG. 1 of the drawings. Conventional means of supplying appropriate needed and regulated replacement water from commercial sources into water reservoir 13 will be readily apparent and readily available to any experienced plumber or air water treatment engineer.

Also within air treatment plant 11 there is provided an appropriate water or liquid pump 22 with its input duct situated below the surface of the water in water reservoir 13 with the output of said power driven fluid pump 22 being conveyed by riser pipe 23 which in turn connects to a plurality of air scrubber distribution manifold pipes 16 — 16. Said supply of pressurized water from water reservoir 13 and fluid pump 22 is then channelled into and through a plurality of air scrubber spray nozzles 15 — 15 into the moving column of incoming air passing through the input portion of air treatment plant 11. Air scrubber spray nozzles 15 — 15 should be adjusted to produce a fine spray of liquid or water mist falling through the incoming column of air but said supply of spray liquid or water should also be driven into the moving column of air with sufficient force to produce a pervasive amount of moisture in the air that will reach substantially every particle of pollutant carried in said moving column of air. As indicated in FIG. 1 the residue of said air scrubber spray water will fall back into reservoir of water 13 in the floor of the input section of air treatment plant 11 for recirculation carrying with it most of the particles of pollutant collected from the moving column of air. Such collected pollutant materials merge with the water in water reservoir 13 and suitable bleed off or overflow ducts 38 should be provided to remove dirty water, sludge and overflow from reservoir 13. The details as to specific ways and means of providing and constructing suitable drain off ducts 38 are well known in the art and will not be dealt with in detail in this specification.

Depending upon local conditions and requirements the local air treatment engineers may desire to combine the water in reservoir of water 13 with one or more water treatment chemicals to expedite and increase the efficiency of said air scrubber system 14 or to facilitate the removal of moisture and associated polllutants from the column of air being scrubbed and washed. It may also be desirable to include a water refrigeration and chilling apparatus 44 as shown in FIG. 7 to cool the water going through riser pipe 23 and subsequent air scrubber spray nozzles 15—15 and air washer filter structure 17 since cooling the washing water aids in the condensation and consolidation of pollutants and fine debris into large water drops that will fall more readily into water reservoir 13 or debris catching bin 50.

As the column of air continues to move through air treatment plant 11 moving from air scrubber system 14 toward suction-blower fan means 26 the column of air will be pulled through air washer filter structure 17 and then subsequently through one or more gas or vapor filter treatment systems such as activated charcoal filter 24.

Said air washer structure 17 is composed of a plurality of spaced apart concave trough shaped washer basins 18—18 installed in superimposed relationship one immediately above the other such that the lowest point of the bottom of one concave basin is situated only a tiny fraction of an inch above the water level in the basin immediately below. A regulated or metered water supply input means 21 of conventional plumbing character supplied with water from riser pipe 23, liquid pump 22 and reservoir 13 provides a substantially constant flow of water into the upper basin 18 of said air washer structure. Each of said superimposed spaced apart air washer basins 18—18 is provided with one or more basin drain orifices 20—20 so that parts of the input water supply into each washer basin flows through said orifices 20—20 into the lower basins. Solid particles collected from the air moving through said washer basin may be channelled through said orifices 20—20 to lower basins until ultimately deposited in water reservoir 13. Said air washer basins 18 — 18 are horizontally positioned and spaced apart in superimposed relationship with respect to each other with the rear or output edge of each of said water basins 18 — 18 being slightly higher than the forward input edge of each of said air washer basins 18 — 18. Since water will be poured into said plurality of basins 18 — 18 and will collect from the moving column of scrubbed air faster than said supply of water can flow through orifices 20 — 20 provided in the bottom of each air washer basin 18 — 18 the excess supply of water will spill over the forward input lip to each of said horizontally positioned air washer basins 18 — 18 thus providing a falling curtain of water across the input face of air washer filter structure 17 and this curtain of falling water will tend to pick up and carry with it back to water reservoir 13 much of the moisture in the air; and as said moisture will have formed around many of the pollution particles said washer system of falling water will carry much of the pollutant collected from the moving column of air downward to be merged into reservoir of water 13.

Figure 4:
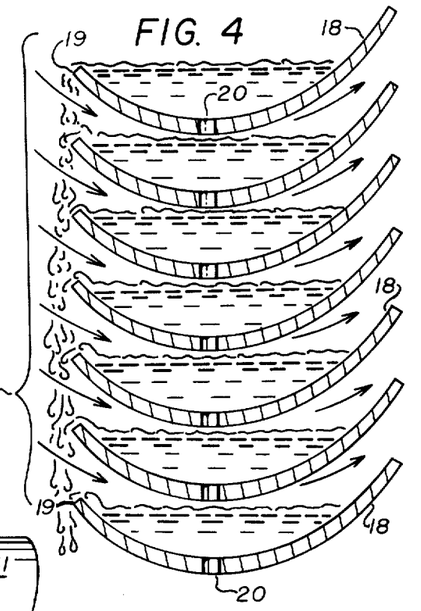
FIG. 4 is an end plan view of plurality of washer basins employed in the air washer system in said air treatment and recirculation plant.

Some amount of pollutant laden moisture will successfully pass through the curtain of falling water at the input of air washer system 17 but said moisture laden air must now be squeezed through the narrow space between the bottom of superimposed air washer basins 18 — 18 and the surface of the water standing in the next lower air washer basins 18 — 18. Since said washer basins 18 — 18 will usually be made of metal and since the exterior or bottom surface of a metal container filled with a liquid will usually be slightly cooler in temperature than the prevailing air or room temperatures in the area, the residue of moisture in the column of air being compressed between said spaced apart plurality of air washer basins 18 — 18 will be subjected to a slight drop in temperature precipitating condensation of the moisture in said column of moving air and increasing the tendency of said moisture to fall and merge into the trough of water in the washer basin immediately below. Note also that the flow of air passing through and leaving air washer system 17 must flow up the inclined surfaces of the output end of each of said air washer basins 18 — 18 where they will be brushing past bare metal surfaces with still further tendency for the remaining moisture in the air to be condensed out and flow back down into the bottom trough of said plurality of washer basins 18 — 18. The details concerning the positioning and operation of air washer basins 18 — 18 and air wash system 17 may be more fully appreciated by examination of FIG. 4 where it can be clearly seen that the flow of air is compressed between the bottom of upper basins 18 and the surface of the water in adjacent lower basins 18 such that condensing moisture in the squeezed air is almost sure to merge into the basin of water over which it is being passed.

The air washer filter means 17 may drain directly into water reservoir 13 as shown in FIG. 1, or liquid pump 22 and refrigeration apparatus 44 may be placed outside the reservoir while a separate filter drain-off and water eliminated basin 54 is placed under air washer filter means 17, water condensing and removing wire screen 45 and charcoal filtering process 24 to drain excess cleansing water from the previous three treatment steps into water drainage pipe 46 to be eliminated through the storm sewer system as shown in FIG. 7. To aid in eliminating some of the fine moisture droplets from the moving column of air so that they will not be needlessly absorbed by the charcoal filtering process 24, a water condensing and removing wire screen 45 next in line to the air washer filter 17 as shown in FIG. 7. The water condensing screen would be very similar to a conventional criss-cross wire screen but have a small enough clearance between the wires to prompt condensation and trapping of water droplets onto the surface of the screen 45 to be elimnated from the flow of air as they condense into larger drops and flow down of air as they condense into larger drops and flow down the screeen into filter drain-off and water elimination basin 54. Water removing water screen 45 may also be chilled to aid in the condensation of water droplets as the air moves through it.

Figure 3:
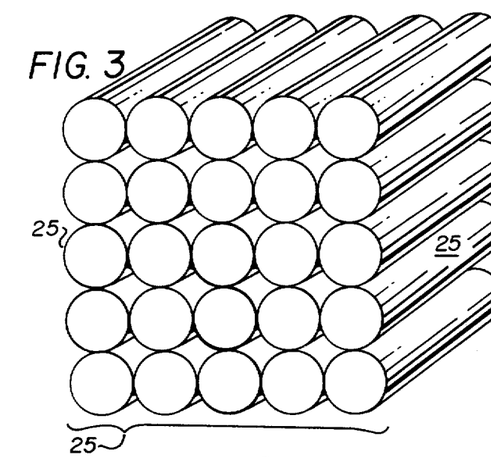
FIG. 3 is a perspective view of so-called charcoal sticks that form an integral part of activated charcoal filter means in the air treatment and recirculation plant.

The column of washed air leaving air washer system 17 will then be channelled or pulled through an appropriately constructed replaceable activated charcoal filter structure 24 installed within treatment plant 11 in such manner that it is positioned perpendicular to the air flow route so that air coming out of the air wash system must flow through said activated charcoal filter. A number of commercially fabricated charcoal filter panels suitable for the purposes contemplated by this invention are already available upon the market but the inventor prefers a replaceable charcoal filter structure 24 composed of a plurality of rod shaped activated charcoal sticks 25—25 arranged in parallel as illustrated in FIG. 3 of the drawings herein such that the moving column of air must flow through the narrow spaces between said sticks of activated charcoal. The cylindrical configuration of charcoal sticks 25—25 also presents an increased surface area for absorption of gaseous pollutants with minimum susceptibility of becoming saturated and soggy with moisture collected from the air.

The principal value of replaceable charcoal filters 24 is that activated charcoal can absorb from the air vapors and gaseous pollutants which resist being washed out by the air scrubbing and air washing system, the pollutant absorption capacity of said activated charcoal is diminished to some extent when the surfaces of the charcoal become saturated with moisture. It was therefore a purpose of a part of the structure involved in air washer system 17 to remove a substantial part of the water vapor together with more solid and soluble pollutants from the moving air stream before said air stream was allowed to pass through activated charcoal filter 24. By placing said successive steps of air scrubbing and air washing systems at properly spaced intervals before channelling said washed air through activated charcoal filter 24, said activated charcoal filter 24 is made more effective in absorbing and removing solid pollutants from the moving column of air and the useful life of each replaceable charcoal filter 24 will be extended for a longer period of time between servicing.

At a suitable point within housing structure 12 of air treatment plant 11 there should be provided a suitable suction-blower device 26 such as a very large fan or suitable gas pump together with such power source or motor drive mechanism 27 as may be needed to drive said suction-blower means 26. The construction of appropriate or suitable power driven suction-blower fan or air moving means are already widely known in the air treatment art and no attempt is made at this point to recommend specific choices of equipment or structure. Any suitable means of providing satisfactory suction-blower means for moving a substantial quantity of air is within the contemplation of the Invention and the Inventor does not claim to be offering any new or specially novel means of moving said column of air beyond those already known for moving quantities of air.

It will be readily apparent that such an air treatment system will need to be de-activated or turned off during periods of heavy rain fall and during periods when there is minimum traffic along the treated thoroughfares, but the system may need to be turned on and operated at some intermediate or modified level during periods of light traffic and operated at full capacity during periods of prolonged heavy smog and during periods when the thoroughfare is subjected to 8 A.M. and 5 P.M. traffic jams. Programmed and automated central control devices to start, stop and control the operation of said air treatment facilities will be necessary and such automated control devices and systems are indicated only generally by control panel 29 in FIG. 1 of the drawings herein because an abundance of satisfactory and dependable commercial control devices are already available and can be tailored to meet the requirements of a specific situation by any competent air conditioning engineer.

Output duct means 28 for communicating said washed and treated air back into the street and sidewalk areas is illustrated only generally in FIG. 1 of the drawings as an air outlet means. In practical application design engineers installing such a system would provide air distribution ducts and outlet orifices to distribute said washed and treated air along strategic parts of sidewalks adjacent to heavily trafficked auto thoroughfares in such manner as to provide a more abundant supply of purified air to pedestrians having to walk along sidewalks parallel to said lanes of moving traffic. Again the matter of providing suitable air distribution and outlet ducts 28 — 28 is a matter of applying commercially available hardware and standard air conditioning engineering expertise to the resolution of a specific air distribution problem dictated by the configuration of the streets and buildings and structures involved in the actual area to be serviced which is not necessarily a part of the novel portions of this Invention.

OPERATION

The operation of the method and apparatus claimed in this Invention is almost necessarily implicit in the structure described above. Automated sensing means connected to programmed automated control apparatus 29 sample outside atmospheric conditions and pollution levels and in response thereto start, stop and otherwise regulate and control the operation of said area air treatment plant as may be necessary to provide cleaner air and better comfort in the area selected for treatment.

When suction-blower fan means 26 is turned on by automated control means 29, air is pulled through the length of air treatment plant 11 which in turn pulls air through input air duct 37. Since input air duct 37 connects with storm sewer passageways 31 — 31 a draft or moving column of air is set in motion throughout storm sewer passageway system 31 — 31 from the area selected and isolated by a first water-relief, air-seal valve control means 32 to a second or additional similar water-relief air-seal seal valve control and isolating means 32 so that the draft or vacuum pull established within the selected isolated and limited portion of storm sewer passageway system 31 — 31 causes polluted air to be pulled in from adjacent and neighboring streets and auto thoroughfares through air inlets 36 — 36 into said storm sewer passageway system 31 by which said polluted air is channelled back into input air duct 37 and from there into area air treatment plant 11 for scrubbing, washing, purification and treatment as previously described.

ADVANTAGES OF THE INVENTION

In the foregoing description of the structure and operation of the Inventin set forth herein a number of advantages have been claimed for the method and apparatus and others will be readily apparent to persons skilled in the art.

A material advantage of the Inventin described and commended herein is that it devises a means of cleaning, treating and purifying air and smog from heavily trafficked streets and auto thoroughfares that is brought within the financial resources of many communities by exploiting the already installed air space in conventional municipal storm sewers as low cost air passageways through said storm sewer lines to regional or area air treatment and recirculation plants.

Another advantage of the Invention is that the Invention proposed employs a combination of air treatment and purification steps, in conjunction with the already installed and existent storm sewer system, that can substantially clean and purify large quantities of air at minimum expense by using low cost air scrubbing and air washing techniques of air purification as preliminary means of desaturating said polluted air of the more solid and heavier particles before passing said air through more expensive filtering means that have only limited absorption capacity.

A further advantage of the Invention is that it employs air treatment processes and apparatus that seek to trap and remove as large a proportion of the air pollutant material as possible into a water solution that can be conveniently and inexpensively disposed of through the city's conventional sewage system.

A still further advantage of the Invention is that it devises an automatically operated valve system which will block the flow of air and thereby permit the designer of such an air treatment system to isolate, limit and control the area from which polluted air is drawn to a defined area of sufficiently lilmited size as to be within the working capacity of the particular air treatment plant designed for the area while providing means for automatically opening such valves by the flow of water so that said water-released air-seal valves permit water to freely flow through said storm sewers in conventional manner when rains occur.

A further advantage of this invention is that it provides a variety of means for eliminating insects, paper and other flying debris from the stream of air to be cleaned before it is treated.

Another advantage of the invention is that after the air has been cleaned with water in the heating, scrubbing, and filtering processes there is provided various means of condensing and eliminating excess water vapor before the air is further cleaned and before it is released again upon the streets as cleaned, slightly cooled air.

And a very material advantage of the invention to pedestrians with bronchitis, emphysema, and related respiratory disorders who must use sidewalks adjacent to heavily trafficked streets and auto and bus thoroughfares is that at last it proposes and provides a practical means of supplying washed and purified air for circulation along said sidewalk areas where such pedestrians must walk.

Although this specification describes but a single embodiment of the Invention with certain applications thereof, it should be understood that structural or material rearrangements of adequate or equivalent parts, substitutions of equivalent functional elements and other modifications in structure can be made and other applications devised without departing from the spirit and scope of my invention. I therefore desire that the description and drawings herein be regarded as only an illustration of my invention and that the invention be regarded as limited only as set forth in the following claims, or as required by the prior art.

Having thus described my invention, I claim:

1. Air pollution treatment apparatus designed for use with conventional storm sewer lines as part of a system for cleaning and recirculating air along auto traffic thoroughfares, said apparatus comprising:
   A. a system of storm sewer lines employed as air passageways paralleling streets from which polluted air is to be treated and recirculated;
   B. self operating water-relief, air-seal valve means for isolating and limiting air flow through said storm sewer passageways to the area selected for treatment by a particular air treatment recirculating unit;
   C. air inlet means from the street and sidewalk area into said storm sewer passageways;
   D. air duct means from said storm sewer passageways into an area air treating and recirculating unit;
   E. an adjustable input air flow regulator vent to assist in reducing flying debris in the air stream and to permit a temperature dropping reduction in air pressure between said adjustable input air flow regulator vent and the air wash apparatus;
   F. a preliminary "air beating" shower bath chamber with associated pre-wash and ramp drain structure to wash out flying debris and solid particles of dust and pollen in the air stream;
   G. an area air treating and recirculating plant with automatic washing and purifying contaminated air;
   H. means for chilling or refrigerating the water used for the air-wash spray systems;
   I. output duct means for communicating said treated washed air back into street and sidewalk areas.

2. The air pollution treatment apparatus described in claim 1 with the area air treating and recirculating plant comprising:
   A. a first mechanical filter structure interposed at the air input entrance to said air treatment plant;
   B. a second air scrubber filter means constructed to spray water through the incoming columns of polluted air;
   C. a third air washer filter means;
   D. an activated charcoal filter means;
   E. a suction-blower means for pulling contaminated air through the selected strom sewer passageway and into and through said air treatment plant;
   F. motive power means to operate said suction-blower device; and
   G. automated control means for starting, stopping and controlling the operation of said area air treatment plant.

3. The air pollution apparatus described in claim 2 except that the first mechanical filter structure mentioned in element A of claim 2 has been replaced by a motor driven rotary input debris sweep mechanism having a plurality of concave debris trapping fins that gather debris during part of their cycle of rotation and automatically dump the gathered debris at the bottom of each fin's cycle.

4. Air pollution treatment apparatus designed for use with conventional storm sewer lines as part of a system for cleaning and recirculating air along auto traffic thoroughfares, said apparatus comprising:
   A. a system of storm sewer lines employed as air passageways paralleling streets from which polluted air is to be treated and recirculated;
   B. self operating water-relief, air-seal valve means for isolating and limiting air flow through said storm sewer passageways to the area selected for treatment by a particular air treatment recirculating unit;
   C. air inlet means from the street and sidewalk area into said storm sewer passageways;
   D. air duct means from said storm sewer passageways into an area air treating and recirculating unit;
   E. an area air treating and recirculating plant having:
      1 a first mechanical filter structure interposed at the air input entrance to said air treatment plant,
      2 a second air scrubber filter means constructed to spray water through the incoming columns of polluted air,
      3 a third air washer filter means,
      4 means of chilling or refrigerating the water used for the air wash spray step,
      5 a water condensing and water removing wire screen interposed at an intermediate point after the air washer steps and before the charcoal filter means,
      6 an activated charcoal filter means,
      7 a suction-blower means for pulling contaminated air through the selected storm sewer passageway and into and through said air treatment plant,
      8 motive power means to operate said suction-blower device, and
      9 automated control means for starting, stopping and controlling the operation of said area air treatment plant;
   F. output duct means for communicating said treated washed air back into street and sidewalk areas.

5. A method of employing storm sewer passageways as a part of a process for collecting polluted air along auto traffic thoroughfares and cleaning and recirculating said air, said method comprising the steps of:
   A. collecting polluted air from street and sidewalk levels by air intake means at street side storm sewer openings;
   B. transporting said collected polluted air through controlled portions of existing storm sewer passage ways to an area air treating and recirculating unit;
   C. preliminary sweeping and beating of input air stream to remove debris and solid particles that could clog up subsequent parts of the purification apparatus;
   D. scrubbing, washing and filtering said polluted air in area air treatment units; and
   E. cooling air to be used in air scrubbing and washing process;
   F. reducing residual humidity from the washed air at an intermediate point in the treatment process;
   G. recirculating said cleaned and treated air to street areas.

* * * * *